United States Patent Office 2,888,447
Patented May 26, 1959

2,888,447

PROCESS OF PRODUCING 1,1,4,4-TETRAFLUOROBUTATRIENE AND PRODUCT

Elmore L. Martin and Robert E. Putnam, Wilmington, Del., assignors to E. I. du Pont de Nemours and Company, Wilmington, Del., a corporation of Delaware No Drawing. Application December 19, 1956
Serial No. 629,232

5 Claims. (Cl. 260—92.1)

This invention relates to a new composition of matter and to its preparation.

Compounds containing only carbon and fluorine possess considerable utility as dielectrics, refrigerant liquids, propellants in spray perfumes, insecticides, etc., and as polymer intermediates. The outstanding example of a polymerizable fluorocarbon is tetrafluoroethylene, which in the polymerized state has attained considerable importance in many industrial applications. Another such fluorocarbon is 1,1,4,4-tetrafluoro-1,3-butadiene which is prepared by reacting acetylene with tetrafluoroethylene at 350° to 900° C. (U.S. 2,743,303).

One object of the invention is to prepare a new polyunsaturated fluorocarbon which has three vicinal olefin double bonds. Another object is the synthesis of novel polymer intermediates. Other objects of this invention will become apparent from a consideration of the following description.

The new polyunsaturated fluorocarbon of this invention is 1,1,4,4-tetrafluorobutatriene. It is obtained by treatment of a 1,4-dihalo-1,1,4,4-tetrafluoro-2-butene wherein the dihalo-substituents are chlorine, bromine, or iodine and mixtures thereof, with an aqueous alkali metal hydroxide of at least 75% strength. This treatment removes the hydrogen and the dihalo-substituents from the 1,4-dihalo-1,1,4,4-tetrafluoro-2-butene.

1,4-dihalo-1,1,4,4-tetrafluoro-2-butenes which are used as starting materials in the process can be represented by the following formula:

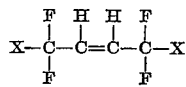

wherein X is chlorine, bromine or iodine. Both X's need not be the same.

The alkali metal hydroxides which constitute the second reactant are potassium, sodium and lithium hydroxides of at least about 75% concentration.

Theoretically at least two moles of alkali metal hydroxide per mole of 1,4-dihalo-1,1,4,4-tetrafluoro-2-butene are required for the dehydrohalogenation. In practice, however, an excess of the alkali metal hydroxide is used in order to maintain the reaction mixture in the molten state.

In the novel process a 1,4-dihalo-1,1,4,4-tetrafluoro-2-butene such as 1,4-dichloro-1,1,4,4-tetrafluoro-2-butene or 1,4-dibromo-1,1,4,4-tetrafluoro-2-butene is added to the alkali metal hydroxide at a controlled slow rate of about 0.2 cc. per minute. Faster or slower rates can be used, if desired, but this has no practical advantage. The process should be carried out at temperatures in the range of 100°–160° C. Because of the explosive nature of the 1,1,4,4-tetrafluorobutatriene in contact with air, it is essential that the process be carried out under a blanket of an inert gas such as nitrogen, argon, etc.

A method for preparing the 1,1,4,4-tetrafluorobutatriene is as follows: Solid alkali metal hydroxide is charged into a glass reactor, fitted with a thermometer, gas injector, dropping funnel and condenser connected to a receptacle cooled in a solid carbon dioxide-acetone bath. The system is purged of oxygen with deoxygenated nitrogen. 1,4-dihalo-1,1,4,4-tetrafluoro-2-butene is placed in the dropping funnel. The alkali is heated to the molten state. While a continuous stream of deoxygenated nitrogen is passed over the molten alkali metal hydroxide the 1,4-dihalo-1,1,4,4-tetrafluoro-2-butene is added at a controlled rate of about 1 cc. per five minutes. The gases produced are collected in the solid carbon dioxide-acetone cooled receptacle. The product, 1,1,4,4-tetrafluorobutatriene, is stored under nitrogen because it is highly explosive in contact with air at room temperature.

The example which follows is submitted to illustrate and not to limit this invention.

Example

A mixture of 75 g. of commercial 85% potassium hydroxide and 7.5 g. of water in a glass reactor fitted with thermometer, mechanical stirrer, dropping funnel, gas inlet tube, and condenser connected to a receiver cooled in a solid carbon dioxide-acetone mixture was melted under an atmosphere of deoxygenated nitrogen. The temperature of the molten potassium hydroxide was adjusted to about 140° C. and 10 g. of 1,4-dibromo-1,1,4,4-tetrafluoro-2-butene was added dropwise during the course of 30 minutes.

A continuous stream of deoxygenated nitrogen was passed over the molten potassium hydroxide and the reaction product was collected in a trap cooled in a solid carbon dioxide-acetone mixture. A small portion of the reaction product was transferred by distillation under reduced pressure to a 4-mm. O.D. glass tube. The tube was sealed and a narrow sharp peak for fluorine resonance was obtained when the liquid was analyzed at about —50° C. for nuclear magnetic resonance. The simple fluorine resonance of this compound indicates only one type of fluorine atoms and infrared analysis indicated the presence of a fluorinated carbon-carbon double bond.

Mass spectrographic analysis of a dilute mixture of the reaction product and deoxygenated nitrogen indicated that the material had a mass of 24, which corresponds to $C_4F_4$ and is 1,1,4,4-tetrafluoro-1,2,3-butatriene. This tetrafluorobutatriene decomposes violently on contact with air. Samples of the liquid in sealed tubes in the absence of air decompose violently on warming to room temperature. This tetrafluorobutatriene boils at about —5° C., as estimated by its boiling point under reduced pressure.

The butatriene structure is supported by the following evidence: Passage of the reaction product of 1,4-dibromo-1,1,4,4-tetrafluoro-2-butene and molten potassium hydroxide into a cooled solution of excess chlorine in carbon tetrachloride gives 1,2,2,3,3,4-hexachloro-1,1,4,4-tetrafluorobutane, B.P. 102° C./28 mm., refractive index at 25° C. 1.4581. (*Analysis.*—Calc'd. for $C_4F_4Cl_6$: Chlorine=63.17. Found: Chlorine—62.10.) A sample of 1,2,2,3,3,4-hexachloro-1,1,4,4-tetrafluorobutane was prepared as outlined below and found to have a refractive index at 25° C., either alone or in admixture with the hexachloride from the tetrafluorobutatriene of 1.4581.

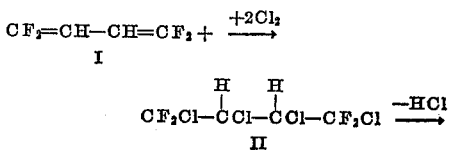

$$CF_2Cl-CH=CCl-CF_2Cl \xrightarrow{+Cl_2}$$
$$\text{III}$$

$$CF_2Cl-CHCl-CCl_2-CF_2Cl \xrightarrow{-HCl}$$
$$\text{IV}$$

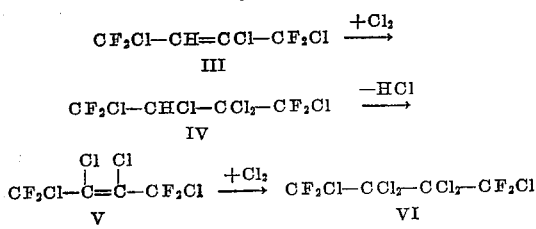
$$\text{V} \qquad\qquad\qquad \text{VI}$$

The physical properties and analyses of the various compounds are tabulated below:

| Compound | Formula | Pressure (mm.) | B.P. (° C.) | Percent Chlorine | |
|---|---|---|---|---|---|
| | | | | Calc'd | Found |
| II | $C_4H_2Cl_4F_4$ | 760 | 138 | 52.9 | 52.7 |
| III | $C_4HCl_3F_4$ | 760 | 103 | 45.98 | 45.87 |
| IV | $C_4HCl_5F_4$ | 49 | 90 | 58.65 | 58.62 |
| V | $C_4Cl_4F_4$ | 215 | 94 | 53.35 | 53.40 |
| VI | $C_4Cl_6F_4$ | 28 | 102 | 63.17 | 63.14 |

The infrared absorption spectrum of a sample of the hexachlorotetrafluorobutane, prepared from the tetrafluorobutatriene, was identical with that of a sample prepared as outlined above and also identical with the spectrum of a sample of the hexachlorotetrafluorobutane obtained by adding chlorine to 2,3-dichloro-1,1,4,4-tetrafluorobutadiene, $CF_2=CCl-CCl=CF_2$.

The tetrafluorobutatriene reacts with excess bromine in carbon tetrachloride to give 1,2,3,4-tetrabromo-1,1,4,4-tetrafluoro-2-butene, $CF_2Br-CBr=CBr-CFBr$, B.P. 103° C./26 mm. (*Analysis*.—Calc'd. for $C_4Br_4F_4$: Br, 72.05. Found: Br, 72.10.) Oxidation of the tetrabromotetrafluoro-2-butene with potassium permanganate gives bromodifluoroacetic acid, $CF_2Br-COOH$, B.P. 87° C./82 mm. (N.E. Calc'd. 175. Found: 177). The infrared absorption spectra of this acid is identical with that obtained by the permanganate oxidation of 1,4-dibromo-1,1,4,4-tetrafluoro-2-butene $$CF_2Br-CH=CH-CF_2Br$$

The 1,4-dibromo-1,1,4,4-tetrafluoro-2-butene used as a starting material is a liquid which boils at 112°–114° C. at atmospheric pressure. This compound is made as follows:

80 g. of bromine was added to a flask fitted with a condenser cooled with solid carbon dioxide-acetone mixture. The flask itself was cooled in a bath of ice and water. 1,1,4,4-tetrafluoro-1,3-butadiene was distilled into the flask until 63 g. of the diene had been added. The reaction mixture was allowed to warm to room temperature, whereupon a nearly colorless reaction mixture was obtained. Distillation of the product gave essentially a quantitative yield of 1,4-dibromo-1,1,4,4-tetrafluoro-2-butene, B.P. 112°–114° C. *Analysis*.—Calc'd. for $C_4H_2Br_2F_4$: C, 16.8; H, 0.7; Br, 56.0. Found: C, 16.5; H, 0.9; Br, 56.3.

The 1,1,4,4-tetrafluorobutatriene is a gas which polymerizes readily on standing overnight (24 hours), even at solid carbon dioxide-acetone temperatures, i.e., −78° C. The poly(1,1,4,4-tetrafluorobutatriene) thus obtained is a colorless, soft, rubbery polymer which is useful for all applications where polymers having such physical properties find use. In order to maintain the 1,1,4,4-tetrafluorobutatriene in the monomeric state it is necessary to store it in liquid nitrogen under a blanket of nitrogen.

The 1,1,4,4-tetrafluorobutatriene of this invention is a unique structure being the first example of perfluorinated butatriene. The high degree of unsaturation of this compound makes it a highly reactive structure. It readily forms homopolymers.

We claim:
1. A process for making 1,1,4,4-tetrafluorobutatriene which comprises reacting a compound of the formula

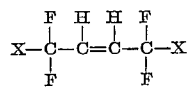

wherein X is selected from the group consisting of chlorine, bromine and iodine, with alkali metal hydroxide of at least 75% concentration, in an inert atmosphere and at a temperature of from 100–160° C.

2. The process of claim 1 wherein the alkali metal hydroxide is potassium hydroxide.

3. A process for making 1,1,4,4-tetrafluorobutatriene which comprises treating 1,4-dibromo-1,1,4,4-tetrafluoro-2-butene with alkali metal hydroxide of at least 75% concentration at 100°–160° C., in an inert atmosphere.

4. 1,1,4,4-tetrafluorobutatriene.

5. A homopolymer of 1,1,4,4-tetrafluorobutatriene.

No references cited.

UNITED STATES PATENT OFFICE

CERTIFICATE OF CORRECTION

Patent No. 2,888,447　　　　　　　　　　　　　　　　May 26, 1959

Elmore L. Martin et al.

It is hereby certified that error appears in the printed specification of the above numbered patent requiring correction and that the said Letters Patent should read as corrected below.

Column 2, line 46, for "had a mass of 24," read -- had a mass of 124, --.

Signed and sealed this 10th day of November 1959.

(SEAL)
Attest:

KARL H. AXLINE
Attesting Officer

ROBERT C. WATSON
Commissioner of Patents